United States Patent
Cornog et al.

(10) Patent No.: US 6,792,433 B2
(45) Date of Patent: Sep. 14, 2004

(54) INDEXING INTERLEAVED MEDIA DATA

(75) Inventors: Katherine H. Cornog, Newburyport, MA (US); Oliver Morgan, Lexington, MA (US)

(73) Assignee: Avid Technology, Inc., Tewksbury, MA (US)

( * ) Notice: Subject to any disclaimer, the term of this patent is extended or adjusted under 35 U.S.C. 154(b) by 530 days.

(21) Appl. No.: 09/828,099

(22) Filed: Apr. 6, 2001

(65) Prior Publication Data

US 2002/0009172 A1 Jan. 24, 2002

Related U.S. Application Data

(60) Provisional application No. 60/195,849, filed on Apr. 7, 2000.

(51) Int. Cl.[7] .............................................. G06F 17/30
(52) U.S. Cl. ................................... 707/104.1; 370/431
(58) Field of Search .......................... 707/2, 102, 104.1; 370/431

(56) References Cited

U.S. PATENT DOCUMENTS

| | | | | |
|---|---|---|---|---|
| 5,642,174 A | * | 6/1997 | Kazui et al. ................. | 348/700 |
| 5,765,164 A | | 6/1998 | Prasad et al. | |
| 5,959,690 A | * | 9/1999 | Toebes et al. ............... | 348/578 |
| 6,041,354 A | * | 3/2000 | Biliris et al. ................. | 709/226 |
| 6,282,209 B1 | * | 8/2001 | Kataoka et al. ............. | 370/498 |
| 6,337,880 B1 | * | 1/2002 | Cornog et al. .......... | 375/240.01 |

FOREIGN PATENT DOCUMENTS

WO    WO 98/39891    11/1998

OTHER PUBLICATIONS

Wilkinson, Jr., "A Tutorial On SDTI–CP". SMPTE Journal, Mar. 2000, vol. 109, No. 3, pp. 205–210.

"Proposed SMPTE Standard For Television—Element And Metadata Definitions for the SDTI–CP", SMPTE Journal, Mar. 2000, vol. 109, No. 3, pp. 226–231.

Proposed SMPTE Standard for Television—SDTI Content Package Format (SDTI–CP), SMPTE Journal, Mar. 2000, vol. 109, No. 3, pp. 212–225.

"OpenDML AVI File Formal Extensions", Open DML AVI M–JPEG File Format Subcommittee, Sep. 1997, pp. i–36.

* cited by examiner

*Primary Examiner*—Uyen Le
*Assistant Examiner*—Haythim J. Alaubaidi
(74) *Attorney, Agent, or Firm*—Peter J. Gordon

(57) ABSTRACT

By providing an index that stores information about how to access each grouping of elements in an interleaved data stream and each element within each grouping, random access to each element in the interleaved data stream can be achieved. The index may store a temporal offset for each grouping for interleaved data streams in which the order of data samples in the interleaved data stream is different from the order in which those data samples are used to present the data stream. The information that allows each element in a grouping to be accessed may include information defining the length of each element, or information describing the relative position of each element in a grouping, such as a map table. Such a map table may have an entry for each data type, wherein each entry includes an indication of information used to access a sample of the data type.

23 Claims, 3 Drawing Sheets

| 58 | 60 | 62 | 64 | 66 | 68 |
|---|---|---|---|---|---|
| temporal_offset | Flags | | disk_offset | delta_offset[0] | delta_offset[1] |
| | | | a | b-a | c-a |
| | | | e | f-e | g-e |
| | | | | | |

| 71 | 73 | 72 |
|---|---|---|
| | element_type | Offset |
| 70 | S | 0 |
| | V | SLENGTH |
| | A | SLENGTH + VLENGTH |
| | X | SLENGTH + VLENGTH + ALENGTH |

FIG. 6

| 81 | 83 | 82 | 84 |
|---|---|---|---|
| | element_type | Column | offset |
| 80 | S | 0 | 0 |
| | V | 0 | SLENGTH |
| | A | 1 | 0 |
| | X | 1 | ALENGTH |

FIG. 7

| temporal_offset | Flags | disk_offset[0] | disk_offset[1] |
|---|---|---|---|
| | | a | c |
| | | e | g |
| | | | |

FIG. 8

| temporal_offset | Flags | disk_offset | delta_offset[0] |
|---|---|---|---|
| | | a | c-a |
| | | e | g-e |
| | | | |

FIG. 9

INDEXING INTERLEAVED MEDIA DATA

CROSS REFERENCE TO RELATED APPLICATION

This application is a nonprovisional application that claims the benefit of provisional application serial No. 60/195,849, filed Apr. 7, 2000, and hereby incorporated by reference.

BACKGROUND

Interleaved media describes media data of multiple channels. Examples of media data are video, audio, system and auxiliary data. Other types of media also may be used. The media data in each channel is divided into time based segments. That is, a segment contains samples of data that occur for a duration of time, typically the duration of one sample of the media data with the lowest sampling rate among the multiple channels. For example, a segment of video data may be one frame or one field. A segment of audio data may contain a number of audio samples that correspond to one frame or one field of video data. An element of an interleaved data stream includes a segment of one of the channels of media data, optionally encoded in a format such as KLV. An interleaved data stream is created by multiplexing together elements of the multiple channels of media data into a sequence of groupings of elements from one time segment. An example of interleaved media data is SDTI-CP (Serial Digital Transport Interface—Content Packages) containing system data, MPEG video data, uncompressed audio data, and auxiliary data, as defined in SMPTE 326M, 331M and RP204. In SDTI-CP, groupings of elements are referred to as content packages, but the invention is not limited to interleaved formats defined as having "content packages." The invention is applicable to all interleaved media data in which several elements of media data are multiplexed together in time-based groupings.

Elements within a grouping may contain different numbers of bytes. Each element of a grouping may contain a constant number of bytes from grouping to grouping. Such elements are called constant elements. Interleaved data streams with such elements are called constant bytes-per-element (CBE) streams. One or more elements of a grouping also may have a number of bytes that varies from grouping to grouping. Such elements are called variable elements. If an interleaved data stream has one or more elements that is a variable element, such an interleaved data stream is called a variable bytes-per-element (VBE) stream. For VBE streams, a stream index is used to locate each element in the multiplexed stream. The purpose of an index is to locate an element based on a temporal reference, such as a field or frame count or a timecode, to the grouping including the element.

For MPEG video, the compressed video pictures in the compressed bitstream may be reordered from their temporal order according to the MPEG specification. An index that takes this reordering into account is described in PCT Publication WO98/46023, which corresponds to U.S. Pat. No. 6,167,083, and in U.S. patent application Ser. No. 09/544,869, now U.S. Pat. No. 6,337,880, entitled "Indexing for Motion Video that is Compressed Using Interframe and Intraframe Techniques," by Katherine Comog, James Hamilton and Oliver Morgan, filed on Apr. 7, 2000, all of which are hereby incorporated by reference.

SUMMARY

By providing an index that stores information about how to access each grouping of elements in an interleaved data stream and each element within each grouping, random access to each element in the interleaved data stream can be achieved. The index may store a temporal offset for each grouping for interleaved data streams in which the order of data samples in the interleaved data stream is different from the order in which those data samples are used to present the data stream. The information that allows each element in a grouping to be accessed may include information defining the length of each element, or information describing the relative position of each element in a grouping, such as a map table. Such a map table may have an entry for each data type, wherein each entry includes an indication of information used to access a sample of the data type.

Accordingly, in one aspect, an index is provided for an interleaved data stream in which elements including samples of at least one data type have an order in the interleaved data stream different from an order in which the samples are presented. Elements including samples of data of each type in a time based segment are combined into groupings. The index includes, for each grouping, an entry that includes a temporal offset to another grouping. The temporal offset of a first grouping indicates an offset in the interleaved data stream between the first grouping and a second grouping containing data for a presentation time corresponding to the position of the first grouping in the interleaved data stream. The entry also includes at least one offset in the interleaved data stream of the grouping. Other information also is stored to enable access to data of a sample of each type in the grouping. In one embodiment, the other information may include a length value stored with the data of each sample indicative of the length of the data for the sample in the interleaved data stream. In another embodiment, the other information may include a map table having an entry for each data type, wherein each entry includes an indication of information used to access a sample of the data type.

Accordingly, in one aspect, an index is provided for an interleaved data stream in which elements include samples of at least one data type. Elements including samples of data of each type in a time-based segment are combined into groupings. The index includes, for each grouping, an entry comprising at least one offset in the interleaved data stream of the grouping. A map table has an entry for each data type, wherein each entry includes an indication of information used to access a sample of the data type.

In various embodiments, the index may include a disk offset for each data type in a grouping, wherein the information in each entry in the map table includes an indication of the location in the entry in the index for the disk offset for the data type. The disk offset for each data type that is not a first data type in a grouping may be stored as a difference between the disk offset for the data type and the disk offset for the first data type.

In another embodiment, the information in an entry of the map table that is used to access a sample of the data type may include an offset from the beginning of a grouping to the beginning of data defining the sample of the data type in the grouping.

In another embodiment, the index may include a disk offset for two or more data types in a grouping. The information in an entry for a data type in the map table may include an indication of the location in the entry in the index for a disk offset for one of the two or more data types and an offset from the disk offset to the beginning of data defining the sample of the data type. The disk offset for each data type that is not a first data type in a grouping may be stored as a difference between the disk offset for the data type and the disk offset for the first data type.

Various other aspects of the invention include the processes and apparatuses for generating and accessing such indexes, and using such indexes to access an interleaved data stream.

BRIEF DESCRIPTION OF THE DRAWINGS

FIG. 5 illustrates another example index.

FIG. 6 illustrates another example map table.

FIG. 7 illustrates another example map table.

FIG. 8 illustrates another example index.

FIG. 9 illustrates another example index.

DETAILED DESCRIPTION

Figures 1, 2, 3, 4:
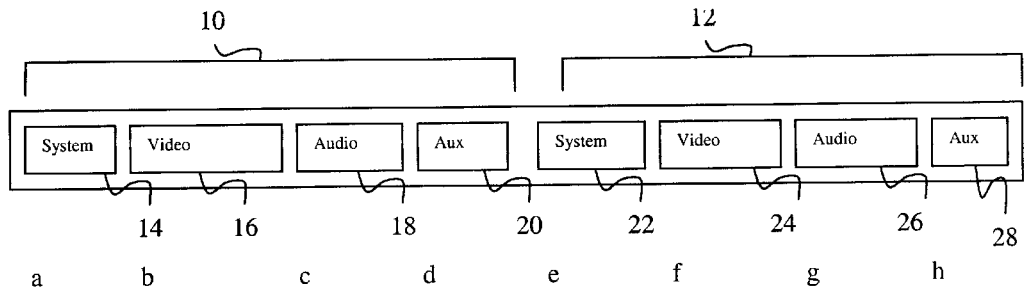
FIG. 1 illustrates an example interleaved media stream.
FIG. 2 illustrates an example index.
FIG. 3 illustrates an example map table.
FIG. 4 illustrates another example index.

FIG. 1 illustrates an example interleaved media stream. Several methods for creating an index of elements in such a stream are described below. The description of each method refers back to FIG. 1. For each method, example data structures and lookup process describing how to locate a particular video or audio element are provided in a pseudo-C language. The temporal offset and flags of the indices shown in U.S. Pat. No. 6,167,083 and U.S. patent application Ser. No. 09/544,869, now U.S. Pat. No. 6,337,880, may be retained in all of the examples of new indices. If none of the elements is temporally reordered with respect to the other elements, the temporal offset field may be omitted from the index. The following description is provided using SDTI-CP as an example of interleaved media data. However, the invention is not limited to interleaved formats defined as having "content packages." The invention is applicable to all interleaved media data in which several elements of media data are multiplexed together in time-based groupings.

FIG. 1 shows the first two content packages 10, 12 in an example interleaved media stream. Each content package 10, 12, comprises, respectively, a system element 14, 22, a video element 16, 24, an audio element 18, 26, and an auxiliary element 20, 28. A letter indicates the disk offset of each element. The disk offset represents an offset in the interleaved data stream to the element in the media stream, and is not limited to an actual location on a disk or other storage medium. These letters are used in the example index tables that follow to identify locations in the media stream.

In a first method, each element stores data indicative of its own length at the beginning, or at a fixed offset from the beginning, of the element. The Key-Length-Value (KLV) format, defined by the Society of Motion Picture and Television Engineers (SMPTE) standard 336M-2001, is an example format in which an element may store data indicative of its own length. In this method, the disk offset stored in the index points to the beginning of the content package, or its first element. To access the individual elements in the content package, the order of the elements is known and fixed. To reach the second element in the content package, the length field of the first element is read and added to the disk offset stored in the index. To access the third element, the length of the second element and length of the first element are added to the disk offset stored in the index. This method can be used to find any element in the content package. A temporal offset and various flags for each entry in the index from other index formats may be retained. The temporal offset is used if one or more elements is reordered relative to the others. A number of bits in the flags may be used to indicate which elements use the temporal offset. Support for a single temporal offset is provided.

An example of such an index is shown in FIG. 2. In FIG. 2, an entry 32 in the index 30 includes an indication of a temporal offset 34, an indication of flags 36 and an indication of a disk offset 38. An entry is provided for each content package. The disk offset 38 designates a point in the data stream from which an element of the content package may be accessed and from which other elements of the content package may be accessed through information about the length of that element. An example data structure is defined by the following pseudo-C language definition:

```
typedef struct {
    int8 temporal_offset;
    uint8 flags;
    uint48 disk_offset;
} index_entry;
index_entry index[NENTRIES];
```

This data structure definition provides for an integer number of entries (NENTRIES) in an index, where each entry has a 48-bit integer representing the disk offset, 8-bits for flags and 8-bits representing a temporal offset.

Pseudo-C instructions for finding the 1st video element include the following:

```
n=1;                                             /* first video is desired */
entry_number = n + index[n].temporal_offset;     /* video is reordered;
                                                    use the temporal offset */
cp_offset = index[entry_number].disk offset
video_offset = cp_offset + system.length         /* system, video, audio,
                                                    aux are KLV */
```

Pseudo-C instructions for finding the 2nd audio element include the following:

```
n=2;                                       /* second audio is desired */
cp_offset = index[n].disk_offset;          /* audio is not reordered so we do
                                              not use the temporal offset */
audio_offset = cp_offset + system.length + video.length;
```

In another method, separate offsets to each of the elements in the content package are stored. A separate map table is used to identify which element type maps to which disk offset. The map table may contain a subset of the elements in the content package. An example map table 43 is shown in FIG. 3. In FIG. 3, there is an entry 40 for each element type in a content package. This example is for system (S), video (V) and audio (A) elements. For each entry, there is a column number 42, indicating which column of a disk offset index stores the disk offset for that element. An indication of the element type 41 also may be stored.

An example index is shown in FIG. 4. In FIG. 4, an entry 44 in the index 46 includes an indication of a temporal offset 48, an indication of flags 50, an indication of a disk offset 52 for a first element [0], an indication of a disk offset 54 for a second element [1] and an indication of a disk offset 55 for a third element [2], where the elements are determined by the map table of FIG. 3. Thus, the video element f of FIG. 1, in the second content package, is found in column [1], according to the map table of FIG. 3, of second entry of the index of FIG. 4. An entry is provided in the index for each content package.

An example data structure for the map table is defined by the following pseudo-C language definition.

```
typedef struct {
    uint8 element_type;
    uint8 column;
} map_entry;
map_entry map[NELEMS];
```

This data structure definition provides for an integer number of elements (NELEMS) in a content package. Each element has an entry indicating the type of the element (as an 8-bit integer) and the column (as an 8-bit integer) in the index that contains the disk offset for that element.

An example data structure for the index is defined by the following pseudo-C language definition.

```
typedef struct {
    int8 temporal_offset;
    uint8 flags;
    uint48 disk_offset[NCOLS];
} index_entry;
index entry_index[NENTRIES];
```

This data structure definition provides for an integer number of entries (NENTRIES) in an index, where each entry has a 48-bit integer representing each disk offset in N columns (NCOLS), with 8-bits for flags and 8-bits for a temporal offset.

```
n=1;                                            /* first video is desired */
entry_number = n + index[n].temporal_offset;    /* video is reordered so
                                                   we use the temporal
                                                   offset */
for (i=0;i<map_length;i++)                      /* find the map entry
    if(map[i].element_type = = 'V')                for video */
        break;
video_map=i;
video_column = map[video_map].column;
video_offset = index[entry_number].disk_offset[video_column];
```

Example pseudo-C instructions for finding the 2nd audio element:

```
n=2;                                /* second audio is desired */
for (i=0;i<map_length;i++)          /* find the map entry for audio */
    if(map[i].element_type = = 'A')
        break;
audio_map=i;
audio_column = map[audio_map].column;
audio_offset = index[n].disk_offsetl[audio_column];
```

In another method, the number of bits used for the index is reduced by storing subsequent disk offsets as offsets from the first disk offset. The location of elements represented by offsets are computed by adding the offset to the disk offset stored in the first column. The same map table of FIG. 3 is used as in the previous method.

An example index is shown in FIG. 5. In FIG. 5, an entry 56 in the index 58 includes an indication of a temporal offset 60, an indication of flags 62, and an indication of a disk offset 64 for a first element [0]. An indication of a disk offset 66 for a second element [1] is provided by the offset of the disk offset for that element from the disk offset for the first element, indicated for example by (b−a). An indication of a disk offset 68 for a third element [2] is provided by the offset of the disk offset for that element from the disk offset for the first element. As with the index in FIG. 4, the elements are determined by the map table of FIG. 3. Thus, the video element f of FIG. 1, in the second content package, is found in column [1], according to the map table of FIG. 3, of the second entry of the index of FIG. 5. An entry is provided in the index for each content package.

An example data structure for the index is defined by the following pseudo-C language definitions:

```
typedef struct {
    int8 temporal_offset;
    uint8 flags;
    uint48 disk_offset;
    uint24 delta_offset[NCOLS-1];
} index entry;
index_entry index[NENTRIES];
```

This data structure definition provides for an integer number of entries (NENTRIES) in an index, where each entry has a 48-bit integer representing the disk offset, but the remaining N elements (NCOLS-1) use 24 bits (in this example). 8-bits are used for flags and for a temporal offset.

Example pseudo-C instructions for finding the 1st video element:

```
n=1;
entry_number = n + index[n].temporal_offset;
for (i=0;i<map_length;i++)
    if(map[i].element_type = = 'V')
        break;
video_map=i;
video_column = map[video_map].column;
cp_offset=index[entry_number].disk_offset;
if (video_column > 0)
    video_offset = cp_offset +
        index[entry_numberl.delta_offset[video_column − 1];
else
    video_offset = cp_offset;
```

Example pseudo-C instructions for finding the 2nd audio element:

```
n=2;
for (i=0;i<map_length;i++)
    if(map[i].element_type = = 'A')
        break;
audio_map=i;
audio_column=map[audio_map].column;
cp_offset=index[n].disk_offset;
if (audio_column > 0)
    audio_offset = cp_offset +
        index[entry_number].delta_offset[audio_column − 1];
else
    audio_offset = cp_offset;
```

Another method is for a content package that comprises a number of constant elements followed by a variable element, which in turn may be followed by a number of constant elements followed by a variable element. The map table gives the order of the elements in the content package and provides a fixed offset to each element from the start of the content package. A single disk offset is used to identify the start of each content package as in the method shown above in FIG. 2. In the example given below, to locate the audio element of the second content package, the offset of the second content package (e) is identified and added to the offset for audio (SLENGTH+VLENGTH) given in the map table. Thus, the location of second audio element is e+SLENGTH+VLENGTH.

An example map table 71 is shown in FIG. 6. In FIG. 6, there is an entry 70 for each element type in a content package. This example is a content package that has system (S), video (V), audio (A) and auxiliary (X) elements, in that order. For each entry, there is an offset 72, indicating the offset to the element from the start of the content package, using the length of other constant elements. An indication of the element type 73 also may be stored. In this example, the length of the auxiliary element may be variable, whereas the other elements have a constant length. In the index shown in FIG. 2, the disk offset of a content package may be obtained by using the temporal reference for the content package. The map table of FIG. 6 is then used to determine the disk offset of each element within the content package.

An example data structure for the map table is defined by the following pseudo-C language definition:

```
typedef struct {
    uint8 element_type;
    uint32 offset;
} map_entry;
map_entry map[NELEMS];
```

This data structure definition provides for an integer number of elements (NELEMS) in the map table, where each entry has an 8-bit integer representing the element type, and a 32-bit integer representing the offset.
Example pseudo-C for finding the 1st video element is:

```
n=1;
entry_number = n + index[n].temporal_offset;
for (i=0;i<map_length;i++)
    if(map[i].element_type = = 'V')
        break;
video_map=i;
cp_offset=index[entry_number].disk_offset;
video_offset = cp_offset + map[video_map].offset;
```

Example pseudo-C for finding the 2nd audio element is:

```
n=2;
for (i=0;i<map_length;i++)
    if(map[i].element_type = = 'A')
        break;
audio_map=i;
cp_offset=index[n].disk_offset;
audio_offset = cp_offset + map[audio_map].offset;
```

Another method combines aspects of the methods described above in connection with FIGS. 3–4 and 6. To accommodate a mixture of constant elements and variable elements in a content package in any order, more than one disk offset may be stored in the index per content package. The map table identifies which of these offsets to use to compute the location of a particular element.

An example map table 81 is shown in FIG. 7. In FIG. 7, there is an entry 80 for each element type in a content package. This example is a content package that has system (S), video (V), audio (A) and auxiliary (X) elements, in that order. For each entry, there is a column 82 and an offset 84. The column indicates which disk offset from the index to use. The offset indicates the offset from the disk offset retrieved from the index to the beginning of the element, using the length of other constant elements. An indication of the element type 83 also may be stored. In this example, the length of the video and auxiliary elements may be variable, whereas the other elements have a constant length. An example data structure for the map table is defined by the following pseudo-C language definition:

```
typedef struct {
    uint8 element_type;
    uint8 column;
    uint32 offset;
} map_entry;
map_entry map[NELEMS];
```

An example index is shown in FIG. 8. In FIG. 8, an entry 90 in the index 92 includes an indication of a temporal offset 94, an indication of flags 96, an indication of a disk offset 98 for a first constant element [0], and an indication of a disk offset 100 for a second constant element [1] that follows a variable element. An entry is provided for each content package. The map table of FIG. 7 determines the elements. Thus, the video element f of FIG. 1, in the second content package, is found by identifying the column [0] for element V in the map table, and using that column number to access the disk offset from that column in the index. That disk offset is added to the offset value for the video element that is stored in the map table.

An example data structure for the index is defined by the following pseudo-C language definition:

```
typedef struct {
    int8 temporal_offset;
    uint8 flags;
    uint48 disk_offset[NCOLS];
} index_entry;
index_entry index[NENTRIES];
```

This data structure definition provides for an integer number of entries (NENTRIES) in an index, where each entry has a 48-bit integer representing each disk offset for the elements (NCOLS). 8-bits are used for flags and for a temporal offset.
Example pseudo-C for finding the 1st video element is:

```
n=1;
entry_number = n + index[n].temporal_offset;
for (i=0;i<map_length;i++)
    if(map[i].element_type = = 'V')
        break;
video_map=i;
video_column = map[video_map].column;
video_offset = index[entry_number].disk_offset[video_column] + map[video_map].offset;
```

Example pseudo-C for finding the 2nd audio element is:

```
n=2;
for (i=0;i<map_length;i++)
    if(map[i].element_type = = 'A')
        break;
```

-continued

```
        audio_map=i;
        audio_column = map[audio_map].column;
        audio_offset = index[n].disk_offset[audio_column] +
        map[audio_map].offset;
```

Another method reduces the number of bits used in the index of the previous method by storing any disk offsets subsequent to the first disk offset as offsets from the first disk offset. This example is similar to the optimization in FIG. 5 over FIG. 4. The map table used is a map table such as shown in FIG. 7. An example of such an index is shown in FIG. 9.

In FIG. 9, an entry 110 in the index 112 includes an indication of a temporal offset 114, an indication of flags 116, an indication of a disk offset 118 for a first constant element, and an indication of a delta offset 120 between the disk offset of the first constant element and the disk offset of a second constant element that follows a variable element. An entry is provided for each content package. The map table of FIG. 7 determines the elements. Thus, the auxiliary element h of FIG. 1, in the second content package, is found by identifying the column for element in the map table, and using that column to access the delta offset in the index. That delta offset is added to the disk offset for the content package (that begins with system element e) to obtain the disk offset of the audio element (g). The offset to the auxiliary element that is stored in the map table (ALENGTH) is then added to that sum to obtain to obtain the disk offset for the auxiliary element (h).

An example data structure for the index of FIG. 9 is defined by the following pseudo-C language definition:

```
        typedef struct {
            int8 temporal_offset;
            uint8 flags;
            uint48 disk_offset;
            uint32 delta_offset[NCOLS-1];
        } index_entry;
        index_entry index[NENTRIES];
```

This data structure definition provides for an integer number of entries (NENTRIES) in an index, where each entry has a 48-bit integer representing the disk offset, but the remaining N elements (NCOLS-1) use 32-bits (in this example). 8-bits are used for flags and for a temporal offset.

Example pseudo-C for finding the 1st video element is:

```
    n=1;                    /* 1st video element */
    entry_number = n + index[n].temporal_offset;
    for (i=0;i<map_length;i++)
        if(map[i].element_type == 'V')
            break;
    video_map=i;
    video_column = map[video_map].column;
    cp_offset = index[entry_number].disk_offset;
    if (video_column > 0)
        video_offset = cp_offset +
        index[entry_number].delta_offset[video_column-1];
    else
        video_offset = cp_offset;
    video_offset = video_offset + map[video_map].offset;
```

Example pseudo-C finding the 2nd audio element is:

```
    n=2;                    /* 2nd audio element */
    for (i=0;i<map_length;i++)
        if(map[i].element_type == 'A')
            break;
    audio_map=i;
    audio_column = map[audio_map].column;
    cp_offset = index[n].disk_offset;
    if (audio_column > 0)
        audio_offset = cp_offset +
        index[n].delta_offset[audio_column-1];
    else
        audio_offset = cp_offset;
    audio_offset = audio_offset + map[audio_map].offset;
```

The data structure for the map table also may include an indication of whether the substream is temporarally reordered. An Example data structure for this embodiment is defined by the following pseudo-C language definitions:

```
        typedef struct {
            uint8 reordered;
            uint8 column;
            uint32 offset;
        } map_entry;
        map_entry map[NELEMS];
```

This data structure adds another field to the data structure described above in connection with FIG. 7 to include an eight-bit value indicative of whether the substream is temporally reordered. The data structure for the index table may remain the same for this embodiment.

Example pseudo-C for finding the n'th sample of a given sub-stream k is:

```
    entry_number = n;       /* sample number counted from start of table */
    sub_stream=k;           /* substream number, for example V == 0,
                               A == 1, Aux == 2 */
    if (map[sub_stream].reordered) entry_number +=
    index[entry_number].temporal_offset;
    cp_offset = index[entry_number].disk_offset;
    col = map[sub_stream].column;
    if (col>0) cp_offset += index[entry_number].delta_offset[col-1];
    cp_offset += map[sub_stream].offset;
```

The following may further optimize the processes shown above. First, the iterative look-up of the map table may be replaced with a straight index operation to obtain fixed length linear execution. In practice, this method is acceptable because the number of sub-streams likely will be limited to probably no more than sixteen. It may be implemented as content-addressable memory in hardware if the number of substreams was a burden. Second, the pseudocode for the removing reordering may be rearranged so that it could be implemented as a simple operation as follows:

entry_number=n;
    if (reorder) entry_number+=index[n].temporal_offset.

Third, the code for video and audio operations may be merged.

A number of methods of creating and using an index into an interleaved stream of media data have been shown. The method described in connection with FIG. 2 uses a single index and an iterative accumulation of offsets to locate the sub-stream of interest. The method described in connection with FIG. 9 combines multiple index columns, a secondary translation from sub-stream to column number, a fixed offset for CBE sub-streams, and the use of offsets for all but the first index column.

Although the use of the methods described in connection with FIGS. 1–8 may be acceptable for applications employing fixed multiplexing formats, the method described in connection with FIG. 9 may be applied to a wide spectrum of multiplexing formats and yet retains simplicity of implementation and optimally small index tables without reordering of sub-streams. These tables allow the addressing of any element in an interleaved data stream that includes a mixture of constant and variable elements, with and without temporal reordering. The method described in connection with FIG. 9 provides full flexibility for indexing a mixture of CBE and VBE streams. The use of fixed offsets for CBE sub-streams, and the encoding of disk offsets as an offset from a first disk offset, provides optimal packing density for index tables. It also is amenable to simple implementation, because it is a fixed execution time algorithm organized for linear execution in pipelined or single-accumulator processors.

An index may be created during capture of the media data from an input source, during creation of the interleaved data stream, or as a process performed after receiving and/or storing the interleaved data stream. The index, in general, is created by inspection of the data in the interleaved data stream using some predetermined information about the interleaved stream, such as the encoding format of the elements, ordering of elements, whether any element has been reordered from its presentation order, and whether the elements are constant elements or variable elements. Given such predetermined information, the interleaved data stream is analyzed to determine the values for each entry for each grouping of elements in the data stream. In general the map tables defined above contain the predetermined information.

Thus, an index for an interleaved data stream in which elements including samples of at least one data type have an order in the interleaved data stream different from an order in which the samples are presented can be in the following way. For each grouping, an entry is generated that includes a temporal offset to another grouping and the offset in the interleaved data stream of the grouping. Other information that would enable access to each element in the grouping is then determined.

The interleaved data stream might not include reordered elements. For such a stream, an entry in the index is generated for each grouping by analyzing the interleaved data stream. This entry includes the offset in the interleaved data stream of the grouping. A map table having an entry for each data type may be generated, such that each entry includes an indication of information used to access a sample of the data type from a grouping of elements in the interleaved data stream.

The index may be stored as part of the same data file that stores the interleaved data stream, either before, or after or distributed within the interleaved data stream. The index also may be stored as a separate file, or in any other manner through which the index may be associated with the interleaved data stream. An index also may be divided into one or more parts for storage. The size of a part of the index may be chosen to be a multiple of a sector size of a storage medium.

Having now described a few embodiments, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. An information product, comprising:
   a computer readable medium;
   information stored on the computer readable medium that is indicative of an index for an interleaved data stream in which elements including samples of at least one data type have an order in the interleaved data stream different from an order in which the samples are presented, and wherein elements including samples of data of each type in a time base segment are combined into groupings, the index comprising:
   for each grouping, an entry comprising:
      a temporal offset to another grouping, wherein the temporal offset of a first grouping indicates an offset in the interleaved data stream between the first grouping and a second grouping containing data for a presentation time corresponding to the position of the first grouping in the interleaved data stream;
      at least one offset in the interleaved data stream of the grouping; and
      other information enabling access to data of a sample of each data type in the elements of the grouping.

2. The information product of claim 1, wherein the other information includes a length value stored with the data of each sample indicative of the length of the data for the sample in the interleaved data stream.

3. The information product of claim 1, wherein the other information includes a map table having an entry for each data type, wherein each entry includes an indication of information used to access a sample of the data type.

4. The information product of claim 3, wherein the index includes a disk offset for each data type in a grouping, wherein the information in each entry in the map table includes an indication of the location in the entry in the index for the disk offset for the data type.

5. The information product of claim 4, wherein the disk offset for each data type that is not a first data type in a grouping is stored as a difference between the disk offset for the data type and the disk offset for the first data type.

6. The information product of claim 3, wherein the information in an entry of the map table that is used to access a sample of the data type includes an offset from the beginning of a grouping to the beginning of data defining the sample of the data type in the grouping.

7. The information product of claim 3, wherein the index include a disk offset for two or more data types in a grouping, wherein the information in an entry for a data type in the map table includes an indication of the location in the entry in the index for disk offset for one of the two or more data types and an offset from the disk offset to the beginning of data defining the sample of the data type.

8. The information product of claim 7, wherein the disk offset for each data type that is not a first data type in a grouping is stored as a difference between the disk offset for the data type and the disk offset for the first data type.

9. The information product of claim 1, wherein the index comprises, for an element, an indication of whether the element has an order in the interleaved data stream different from an order in which the samples from the element are presented.

10. An information product, comprising:
    a computer readable medium:
    information stored on the computer readable medium that is indicative of an index for an interleaved data stream in which elements include samples of at least one data type, and wherein elements including samples of data of each type in a time based segment are combined into groupings, the index comprising:

for each grouping, an entry comprising at least one offset in the interleaved data stream of the grouping; and a map table having an entry for each data type, wherein each entry includes an indication of information used to access a sample of the data type;

wherein the index includes a disk offset for each data type in a grouping, wherein the information in each entry in the map table includes an indication of the location in the entry in the index for the disk offset for the data type; and wherein the disk offset for each data type that is not a first data type in a grouping is stored as a difference between the disk offset for the data type and the disk offset for the first data type.

11. The information product of claim 10, wherein the information in an entry of the map table that is used to access a sample of the data type includes an offset from the beginning of a grouping to the beginning of data defining the sample of the data type in the grouping.

12. An information product, comprising:

a computer readable medium;

information stored on the computer readable medium that is indicative of an index for an interleaved data stream in which elements include samples of at least one data type, and wherein elements including samples of data of each type in a time based segment are combined into groupings, the index comprising:

for each grouping, an entry comprising at least one offset in the interleaved data stream of the grouping; and a map table having an entry for each data type, wherein each entry includes an indication of information used to access a sample of the data type;

wherein the index includes a disk offset for two or more data types in a grouping, wherein the information in an entry for a data type in the map table includes an indication of the location in the entry in the index for a disk offset for one of the two or more data types and an offset from the disk offset to the beginning of data defining the sample of the data type; and wherein the disk offset for each data type that is not a first data type in a grouping is stored as a difference between the disk offset for the data type and the disk offset for the first data type.

13. A method for using an index for an interleaved data streams in which elements including samples of at least one data type have an order in the interleaved data stream different from an order in which the samples are presented, and wherein elements including samples of data of each type in a time based segment are combined into groupings, wherein the index comprises, for each grouping, an entry comprising a temporal offset to another grouping and at least one offset in the interleaved data stream of the grouping and other information enabling access to data of each type in the grouping, wherein the temporal offset of a first grouping indicates an offset in the interleaved data stream between the first grouping and a second grouping containing data for a presentation time corresponding to the position of the first grouping in the interleaved data stream, wherein the method comprises:

for the first sample, accessing a temporal offset to another grouping in an entry in the index corresponding to a given presentation time;

using the temporal offset and the presentation time, accessing an entry for another grouping, to determine a first offset in the interleaved data stream to data corresponding to the first sample;

for the second sample, determining a second offset in the interleaved data stream according to data corresponding to the second sample by accessing an entry in the index corresponding to the given presentation time; and using the first and second offsets to access the data for the first and second samples from the interleaved data stream.

14. The method of claim 13, wherein the index comprises, for an element, an indication of whether the element has an order in the interleaved data stream different from an order in which the samples from the element are presented, and wherein accessing the temporal offset is performed conditionally upon the indication in the index of whether the element has an order in the interleaved data stream different from an order in which the samples from the element are presented.

15. The method of claim 13, wherein the other information includes a length value stored with the data of each sample indicative of the length of the data for sample in the interleaved data stream.

16. The method of claim 13, wherein the data corresponding to a second sample includes a map table having an entry for each data type, wherein each entry includes an indication of information used to access a sample of the data type.

17. A system for using an index for an interleaved data stream in which elements including samples of at least one data type have an order in the interleaved data stream different from an order in which the samples are presented, and wherein elements including samples of data of each type in a time based segment are combined into groupings, wherein the index comprises, for each grouping, an entry comprising a temporal offset to another grouping and at least one offset in the interleaved data stream of the grouping and other information enabling access to data of each type in the grouping, wherein the temporal offset of a first grouping indicates an offset in the interleaved data stream between the first grouping and a second grouping containing data for a presentation time corresponding to the position of the first grouping in the interleaved data stream, wherein the system comprises:

means for accessing, for a first sample, a temporal offset to another grouping in an entry in the index corresponding to a given presentation time;

means, using the temporal offset and the presentation time, for accessing an entry for another grouping, to determine a first offset in the interleaved data stream to data corresponding to the first sample;

means for determining, for a second sample, a second offset in the interleaved data stream according to data corresponding to the second sample by accessing entry in the index corresponding to the given presentation time; and means for using the first and second offsets to access the data for the first and second samples from the interleaved data stream.

18. A method for using an index for an interleaved data streams in which elements include samples of at least one data type, and wherein elements including samples of data of each type in a time based segment are combined into groupings, wherein the index comprises, for each grouping, an entry comprising at least one offset in the interleaved data stream of the grouping and a map table having an entry for each data type, wherein each entry includes an indication of information used to access a sample of the data type, wherein the method comprises:

for a sample, accessing the map table to obtain the information used to access samples of the data type of the sample;

accessing an entry in the index to obtain the at least one offset in the interleaved data stream for the grouping containing the sample;

using the information obtained from the map table and the offset of the grouping containing the sample to access the data for the sample from the interleaved data stream.

19. A system for using an index for an interleaved data streams in which elements include samples of at least one data type, and wherein elements including samples of data of each type in a time based segment are combined into groupings, wherein the index comprises, for each grouping, an entry comprisin at least one offset in the interleaved data stream of the grouping and a map table having an entry for each data type, wherein each entry includes an indication of information used to access a sample of the data type, wherein the system comprises:

means for accessing, for a sample, the map table to obtain the information used to access samples of the data type of the sample;

means for accessing an entry in the index to obtain the at least one offset in the interleaved data stream for the grouping containing the sample;

means, using the information obtained from the map table and the offset of the grouping containing the sample, for accessing the data for the sample from the interleaved data stream.

20. A method for generating an index for an interleaved data stream in which elements including samples of at least one data type have an order in the interleaved data stream different from an order in which the samples are presented, and wherein elements including samples of data of each type in a time based segment are combined into groupings, comprising:

generating, for each grouping, an entry comprising a temporal offset to another grouping, wherein the temporal offset of a first grouping indicates an offset in the interleaved data stream between the first grouping and a second grouping containing data for a presentation time corresponding to the position of the first grouping in the interleaved data stream, and at least one offset in the interleaved data stream of the grouping;

generating other information enabling access to data of each type in the grouping; and storing on a computer readable medium information that is indicative of the entries in the index and the other information.

21. An apparatus for generating an index for an interleaved data stream in which elements including samples of at least one data type have an order in the interleaved data stream different from an order in which the samples are presented, and wherein elements including samples of data of each type in a time based segment are combined into groupings, comprising:

means for generating, for each grouping, an entry comprising a termporal offset to another grouping, wherein the temporal offset of a first grouping indicates an offset in the interleaved data stream between the first grouping and a second grouping containing data for a presentation time corresponding to the position of the first grouping in the interleaved data stream, and at least one offset in the interleaved data stream of the grouping;

means for generating other information enabling access to data of each type in the grouping; and a computer readable medium for storing information that is indicative of the entries in the index and the other information.

22. A method for generating an index for an interleaved data stream in which elements include samples of at least one data type, and wherein elements including samples of data of each type in a time based segment are combined into groupings, comprising:

generating, for each grouping, an entry in the index comprising at least one offset in the interleaved data stream of the grouping;

generating a map table having an entry for each data type, wherein each entry includes an indication of information used to access a sample of the data type; and wherein the index includes a disk offset for each data type in a grouping, wherein the information in each entry in the map table includes an indication of the location in the entry in the index for the disk offset for the data type, and wherein the disk offset for each data type that is not a first data type in a grouping is stored as a difference between the disk offset for the data type and the disk offset for the first data type;

storing on a computer readable medium information that is indicative of the entries in the index and the map table.

23. An apparatus for generating an index for an interleaved data stream in which elements include samples of at least one data type, and wherein elements including samples of data of each type in a time based segment are combined into groupings, comprising:

means for generating, for each grouping, an entry in the index comprising at least one offset in the interleaved data stream of the grouping;

means for generating a map table having an entry for each data type; wherein each entry includes an indication of information used to access a sample of the data type; and wherein the index includes a disk offset for each data type in a grouping, wherein the information in each entry in the map table includes an indication of the location in the entry in the index for the disk offset for the data type, and wherein the disk offset for each data type that is not a first data type in a grouping is stored as a difference between the disk offset for the data type and the disk offset for the first data type;

a computer readable medium for storing information that is indicative of the entries in the index and the map table.

* * * * *